United States Patent
Wang et al.

(10) Patent No.: US 12,404,810 B2
(45) Date of Patent: Sep. 2, 2025

(54) PURGING SYSTEM FOR TURBINE FRACTURING APPARATUS GROUP, PURGING METHOD AND TURBINE FRACTURING APPARATUS GROUP

(71) Applicant: YANTAI JEREH PETROLEUM EQUIPMENT & TECHNOLOGIES CO., LTD., Shandong (CN)

(72) Inventors: Jianwei Wang, Shandong (CN); Rikui Zhang, Shandong (CN); Fuhong Li, Shandong (CN); Zhuqing Mao, Shandong (CN); Peng Zhang, Shandong (CN); Jihua Wang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 1119 days.

(21) Appl. No.: 17/246,061

(22) Filed: Apr. 30, 2021

(65) Prior Publication Data

US 2022/0307424 A1    Sep. 29, 2022

(30) Foreign Application Priority Data

Mar. 23, 2021 (CN) .......................... 202110306134.6

(51) Int. Cl.
  *B08B 9/032* (2006.01)
  *B08B 9/00* (2006.01)
  (Continued)

(52) U.S. Cl.
  CPC ................ *F02C 7/232* (2013.01); *B08B 9/00* (2013.01); *B08B 9/02* (2013.01); *B08B 9/0328* (2013.01);
  (Continued)

(58) Field of Classification Search
  CPC .... F02C 7/232; F02C 9/40; F02C 7/22; F02C 3/22; F02C 3/24; B08B 9/02; B08B 9/00;
  (Continued)

(56) References Cited

U.S. PATENT DOCUMENTS

2012/0167545 A1    7/2012  Raju et al.
2020/0001334 A1*   1/2020  Ngo ........................ B08B 9/023

FOREIGN PATENT DOCUMENTS

CN    102563704 A    7/2012
CN    104373220 A    2/2015
(Continued)

OTHER PUBLICATIONS

Chinese-language Search Report issued in Chinese Application No. 2021103061346 dated Mar. 28, 2025 with partial English translation (4 pages).

(Continued)

*Primary Examiner* — Marina A Tietjen
(74) *Attorney, Agent, or Firm* — Crowell & Moring LLP (57) ABSTRACT

Embodiments of the present disclosure provide a purging system for a turbine fracturing apparatus group and a turbine fracturing apparatus group. The turbine fracturing apparatus group includes a plurality of gas turbines, each gas turbine includes a plurality of fuel supply pipelines. The purging system includes: a first air compressor and a purging pipeline, the purging pipeline communicates the first air compressor with the plurality of fuel supply pipelines of each gas turbine in the turbine fracturing apparatus group, and the first air compressor is configured to, in a case where at least part of the plurality of fuel supply pipelines is stopped from (Continued)

supplying fuel, supply compressed air to the at least part of the plurality of fuel supply pipelines which has been stopped from supplying fuel, so as to perform purging.

14 Claims, 3 Drawing Sheets

(51) Int. Cl.
    *B08B 9/02*     (2006.01)
    *E21B 43/26*     (2006.01)
    *F02C 7/22*     (2006.01)
    *F02C 7/232*     (2006.01)
    *F02C 9/40*     (2006.01)
    *F23R 3/34*     (2006.01)
    *F23R 3/36*     (2006.01)

(52) U.S. Cl.
    CPC ............ *E21B 43/2607* (2020.05); *F02C 7/22* (2013.01); *F02C 9/40* (2013.01); *F23R 3/346* (2013.01); *F23R 3/36* (2013.01); *F05D 2220/32* (2013.01); *F05D 2240/35* (2013.01)

(58) Field of Classification Search
    CPC .......... B08B 9/0328; F23R 3/36; F23R 3/346; F05D 2220/32; F05D 2240/35; E21B 43/26; E21B 43/26
    See application file for complete search history.

(56) References Cited

FOREIGN PATENT DOCUMENTS

| | | | |
|---|---|---|---|
| CN | 204276450 U | | 4/2015 |
| CN | 205559072 U | | 9/2016 |
| CN | 207204785 U | | 4/2018 |
| CN | 108964116 A | | 12/2018 |
| CN | 110469314 A | | 11/2019 |
| CN | 210045687 U | | 2/2020 |
| CN | 111794859 A | | 10/2020 |
| CN | 113513409 A | * | 10/2021 |
| CN | 116335834 A | * | 6/2023 |

OTHER PUBLICATIONS

Chinese-language Office Action issued in Chinese Application No. 202110306134.6 dated Apr. 18, 2025 with English translation (10 pages).

Lianchun, Zhou et al.; "Coal Mine Safety Regulations Expert", 2016, with partial English translation (6 pages).

* cited by examiner

PURGING SYSTEM FOR TURBINE FRACTURING APPARATUS GROUP, PURGING METHOD AND TURBINE FRACTURING APPARATUS GROUP

TECHNICAL FIELD

Embodiments of the present disclosure relate to a purging system for a turbine fracturing apparatus group, a purging method and a turbine fracturing apparatus group.

BACKGROUND

At present, a gas turbine has been widely used in an oil field fracturing equipment for its advantages of small size, light weight, high power, good fuel economy and the like. The gas turbine has excellent fuel compatibility, and diesel oil, well gas, liquefied natural gas (LNG), compressed natural gas (CNG) and even bio-oil can be used as fuel for the gas turbine. Therefore, the gas turbine carried by a fracturing equipment mostly is configured with a bi-fuel supply system of liquid (e.g., diesel oil)/gas (e.g., natural gas), which can realize a free switching between liquid fuel and gaseous fuel during a fracturing operation.

For the gas turbine equipped with the bi-fuel supply system, there are two types of fuel nozzles provided in its combustor. The two types of fuel nozzles usually do not work at the same time. When the gas turbine burns liquid fuel, the gaseous fuel supply is turned off; and when the gas turbine burns gaseous fuel, the liquid fuel supply is turned off. When oil is used as the fuel, an oil nozzle supplies oil to the combustor, and meanwhile an external air compressor needs to supply compressed air with a certain pressure and flow rate to the gas nozzle and its pipeline so as to perform purging. Similarly, when gas is used as the fuel, the gas nozzle supplies gas to the combustor, and meanwhile the external air compressor needs to supply compressed air with a certain pressure and flow rate to the oil nozzle and its pipeline so as to perform purging. By purging a closed fuel nozzle and its pipeline, the fuel remaining in the fuel pipeline can be prevented from spontaneous combustion and deflagration in the pipeline, and ablation and carbon deposition of the fuel nozzle can be avoided.

SUMMARY

Embodiments of the present disclosure provide a purging system for a turbine fracturing apparatus group, a purging method and a turbine fracturing apparatus group. The purging system can purge the fuel pipelines and the nozzles of a plurality of gas turbines at the same time, so that the maintenance of the purging system is more centralized and convenient, and the workload of field operators is reduced, and the operation efficiency is improved.

One embodiment of the present disclosure provides a purging system for a turbine fracturing apparatus group, wherein the turbine fracturing apparatus group includes a plurality of gas turbines, each of the plurality of gas turbines includes a plurality of fuel supply pipelines, the purging system includes: a first air compressor and a purging pipeline, wherein the purging pipeline communicates the first air compressor with the plurality of fuel supply pipelines of each of the plurality of gas turbines in the turbine fracturing apparatus group, wherein the first air compressor is configured to, in a case where at least part of the plurality of fuel supply pipelines is stopped from supplying fuel, supply compressed air to the at least part of the plurality of fuel supply pipelines which has been stopped from supplying fuel, so as to perform purging.

In some examples, the first air compressor is arranged outside a plurality of turbine fracturing apparatuses of the turbine fracturing apparatus group.

In some examples, the purging system further includes an air storage device connected to the purging pipeline, wherein the purging pipeline includes a first purging pipeline and a second purging pipeline, an air inlet of the air storage device is communicated with the first air compressor through the first purging pipeline, and an air outlet of the air storage device is communicated with the plurality of fuel supply pipelines of each of the plurality of gas turbines in the turbine fracturing apparatus group through the second purging pipeline.

In some examples, the purging pipeline further includes a third purging pipeline which directly communicates the first air compressor with the plurality of fuel supply pipelines of each of the plurality of gas turbines in the turbine fracturing apparatus group.

In some examples, the purging system further includes a pressure sensor configured to detect a pressure inside the air storage device and generate a pressure signal.

In some examples, the purging system further includes: a power device connected to the first air compressor and configured to drive the air compressor to operate; and a control device connected to the power device and configured to control the power device.

In some examples, the power device is a hydraulic motor, and the control device includes a processor and a solenoid valve, wherein the processor is respectively communicatively connected to the pressure sensor and the solenoid valve, and is configured to control an opened extent of the solenoid valve according to the pressure signal of the pressure sensor so as to adjust a rotating speed of the hydraulic motor, thereby adjusting a pressure and a flow rate of the compressed air generated by the first air compressor.

In some examples, the solenoid valve is a proportional control valve.

In some examples, the power device is an electric motor, and the control device includes a processor, wherein the processor is communicatively connected to the pressure sensor and configured to control a rotating speed of the electric motor according to the pressure signal of the pressure sensor, thereby adjusting a pressure and a flow rate of the compressed air generated by the first air compressor.

In some examples, the first air compressor is a screw air compressor.

In some examples, a maximum pressure of the compressed air generated by the first air compressor is greater than or equal to 200 psi.

In some examples, the plurality of fuel supply pipelines include a first fuel supply pipeline and a second fuel supply pipeline; under a condition that the first fuel supply pipeline supplies fuel, the second fuel supply pipeline stops supplying fuel, and the first air compressor supplies compressed air to the second fuel supply pipeline; under a condition that the second fuel supply pipeline supplies fuel, the first fuel supply pipeline stops supplying fuel, and the first air compressor supplies compressed air to the first fuel supply pipeline.

In some examples, the first fuel supply pipeline is configured to supply liquid fuel, and the second fuel supply pipeline is configured to supply gaseous fuel.

In some examples, the purging system further includes a second air compressor arranged in parallel with the first air compressor, the second air compressor is configured to supply, either alone or together with the first air compressor, compressed air to the at least part of the plurality of fuel supply pipelines which has been stopped from supplying fuel, so as to perform purging.

One embodiment of the present disclosure provides a purging method of the purging system according to any one of the above, wherein the plurality of fuel supply pipelines of at least one gas turbine in the turbine fracturing apparatus group include a liquid fuel supply pipeline and a gaseous fuel supply pipeline, wherein the liquid fuel supply pipeline is provided with a first switch and the gaseous fuel supply pipeline is provided with a second switch, the purging method includes: turning on the second switch to supply compressed air to the gaseous fuel supply pipeline under a condition that the liquid fuel supply pipeline supplies liquid fuel and the gaseous fuel supply pipeline stops supplying fuel; and turning on the first switch to supply compressed air to the liquid fuel supply pipeline under a condition that the gaseous fuel supply pipeline supplies gaseous fuel and the liquid fuel supply pipeline stops supplying fuel.

In some examples, after receiving an instruction to stop the at least one gas turbine, lowering a flow rate of fuel of the liquid fuel supply pipeline under the condition that the liquid fuel supply pipeline supplies liquid fuel and the gaseous fuel supply pipeline stops supplying fuel, and closing the liquid fuel supply pipeline and turning off the second switch under a condition that an exhaust temperature of the gas turbine is lower than a predetermined temperature; and lowering a flow rate of fuel of the gaseous fuel supply pipeline under the condition that the gaseous fuel supply pipeline supplies gaseous fuel and the liquid fuel supply pipeline stops supplying fuel, and closing the gaseous fuel supply pipeline and turning off the first switch under a condition that the exhaust temperature of the gas turbine is lower than the predetermined temperature.

One embodiment of the present disclosure provides a turbine fracturing apparatus group, including: a plurality of turbine fracturing apparatuses, each of the plurality of turbine fracturing apparatuses includes a gas turbine; and the purging system according to any one of claims 1-14, wherein the purging system is connected to the gas turbine of each of the plurality of turbine fracturing apparatuses.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

For a fracturing truck used in a fracturing operation of an oil-gas well, one of a conventional diesel engine, a gas turbine or an electric motor can be used as the power. Because an output power per unit weight of the gas turbine is higher than that of the diesel engine, the gas turbine is widely used in the fracturing truck, and the fracturing truck equipped with the gas turbine can also be referred to as a turbine fracturing truck for short. When the gas turbine is in operation, under certain working conditions, the fuel pipeline and the nozzle inside the gas turbine need to be purged with air or other gas at a certain pressure and flow rate to improve the operation safety. Purging with air has the advantages of convenient operation and low cost, and is a commonly used method at present.

For example, for a bi-fuel gas turbine that can burn both liquid fuel (such as diesel oil) and gaseous fuel (such as natural gas), it is necessary to purge the natural gas pipeline and the gas nozzle connected at an end thereof when burning diesel oil, and to purge a diesel oil pipeline and an oil nozzle connected at an end thereof when burning natural gas. For a gas turbine burning a single type of fuel (such as natural gas), its combustor usually has a plurality of gas nozzles. Under a condition of non-full load operation, a part of the plurality of gas nozzles can be opened while the others can be closed. At this time, the closed gas nozzles also need to be purged. The fuel remaining in the pipeline can be blown away by purging the fuel pipeline and the nozzle, which can effectively prevent from spontaneous combustion and deflagration in the fuel pipeline, and can also prevent from ablation and carbon deposition of the fuel nozzle.

In the fracturing operation of the turbine fracturing truck in the oil-gas well, usually, a flow rate of fracturing fluid pumped by a single turbine fracturing truck cannot meet the requirements, so it is necessary to use a turbine fracturing truck group composed of a plurality of turbine fracturing trucks for working. The gas turbine of each turbine fracturing truck is equipped with an independent air compressor and an air cylinder, and the air compressed by the air compressor is stored in the air cylinder as an air source for purging the fuel pipeline and the nozzle of the gas turbine.

Figure 1:
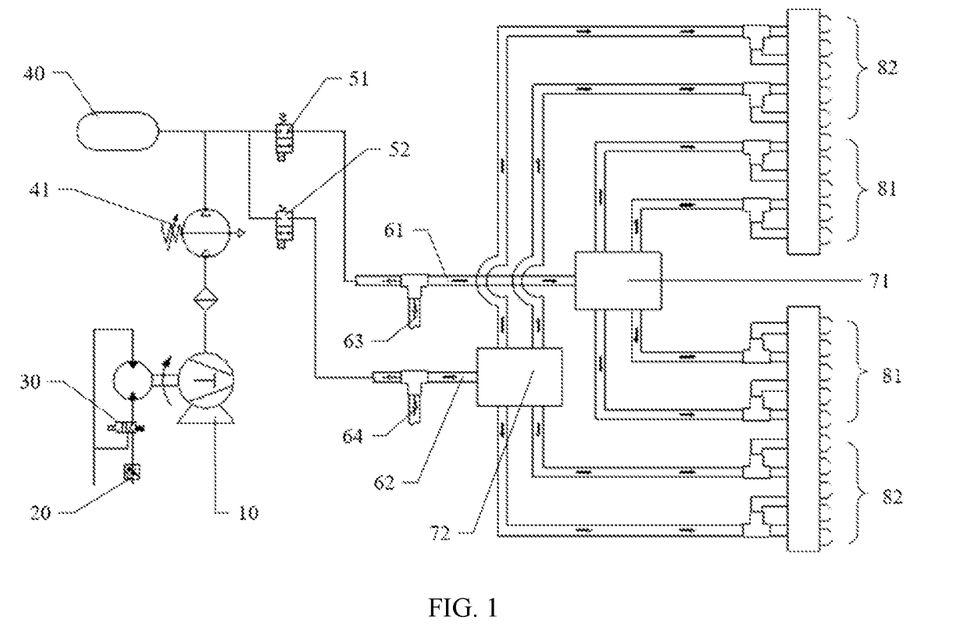
FIG. 1 is a structural diagram of a purging system.

FIG. 1 is a structural diagram of a gas turbine purging system, which illustrates a purging system for a turbine fracturing truck. As illustrated in FIG. 1, an air compressor 10 is driven by a hydraulic motor 20, a rotating speed of the hydraulic motor 20 can be adjusted, and an on-off of an oil supply circuit of the hydraulic motor 20 is controlled by a solenoid valve 30. When the solenoid valve 30 is energized, the hydraulic motor 20 drives the air compressor 10 to work; and when the solenoid valve 30 is de-energized, the air compressor 10 stops working. Before starting the gas turbine every time, it is necessary to start the air compressor 10 firstly to inflate the air cylinder 40, so as to prepare for purging the fuel pipeline and the nozzle.

The gas turbine can be a bi-fuel gas turbine, and the fuel pipeline includes a liquid fuel supply pipeline 61 and a gaseous fuel supply pipeline 62. A liquid fuel supply inlet 63 supplies fuel to the liquid fuel supply pipeline 61, the liquid fuel supply pipeline 61 is provided with a liquid fuel flow divider 71 which divides the liquid fuel supply pipeline into a plurality of branches, and an end of each branch is connected to a liquid fuel nozzle 81. A gaseous fuel supply inlet 64 supplies fuel to the gaseous fuel supply pipeline 62, the gaseous fuel supply pipeline 62 is provided with a gaseous fuel flow divider 72 which divides the gaseous fuel supply pipeline into a plurality of branches, and an end of each branch is connected to a gaseous fuel nozzle 82.

The purging of the liquid fuel pipeline and its nozzles as well as the purging of the gaseous fuel pipeline and its nozzles by the compressed air in the air cylinder 40 are respectively controlled by solenoid valves 51 and 52. For example, the liquid fuel supply pipeline 61 is provided with a first switch 51, and the gaseous fuel supply pipeline 62 is provided with a second switch 52. The first switch 51 and the second switch 52 both can be a solenoid valve.

The gas turbine has certain requirements on the flow rate and the pressure of the air source of the purging system. For example, the flow rate of the compressed air needs to reach 5 CFM (cubic feet per minute), and the pressure of the compressed air needs to reach 200 psi (pound force per square inch).

The air compressor can be a piston compressor, a screw compressor and the like. The air compressor 10 in FIG. 1 is a piston air compressor. The maximum discharge pressure of a common piston air compressor is about 100 psi, which cannot meet the demands on pressure of the purging system. Therefore, as illustrated in FIG. 1, the purging system needs to be equipped with a booster regulator 41. The purpose of the booster regulator 41 is to pressurize the air with lower pressure according to a certain proportion, and store the pressurized compressed air in an air cylinder for use by the purging system. However, during the field application, the booster regulator has the problems of unstable performance and high failure rate.

The screw air compressor can produce compressed air with higher pressure. For example, the discharge pressure of the screw air compressor can reach 200 psi or even 300 psi. The turbine fracturing truck can also be equipped with a screw air compressor.

Figure 2:
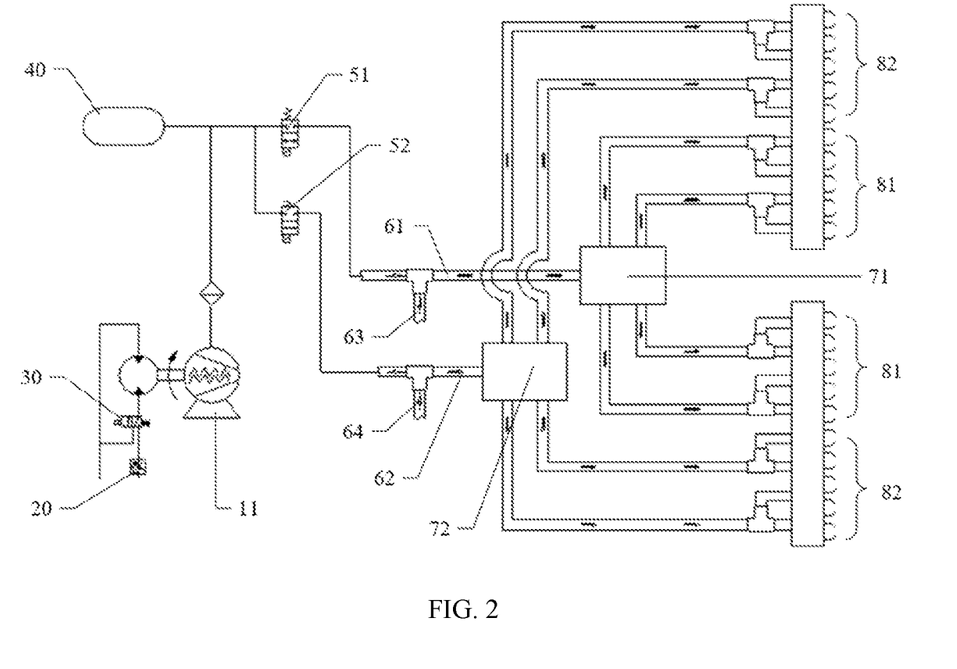
FIG. 2 is a structural diagram of another purging system.

FIG. 2 is a structural diagram of another gas turbine purging system, which illustrates a purging system for a turbine fracturing truck. The purging system is equipped with a screw air compressor 11. Compared with the purging system illustrated in FIG. 1, this purging system omits the booster regulator 41 so as to reduce the failure rate of the purging system.

The screw air compressor has large displacement, and when the exhaust pressure is 200 psi, the displacement can reach 90 CFM, which is much higher than an air amount required by a gas turbine on a fracturing truck. The demand of smaller air amount for the purging system can be satisfied by limiting the rotating speed of the air compressor.

Embodiments of the present disclosure provide a purging system for a turbine fracturing truck group, a purging method, and a turbine fracturing truck group. The purging system can purge the fuel pipelines and nozzles of a plurality of gas turbines at the same time, which makes the maintenance of the purging system more centralized and convenient, reduces the workload of field operators and improves the operation efficiency.

Figure 3:
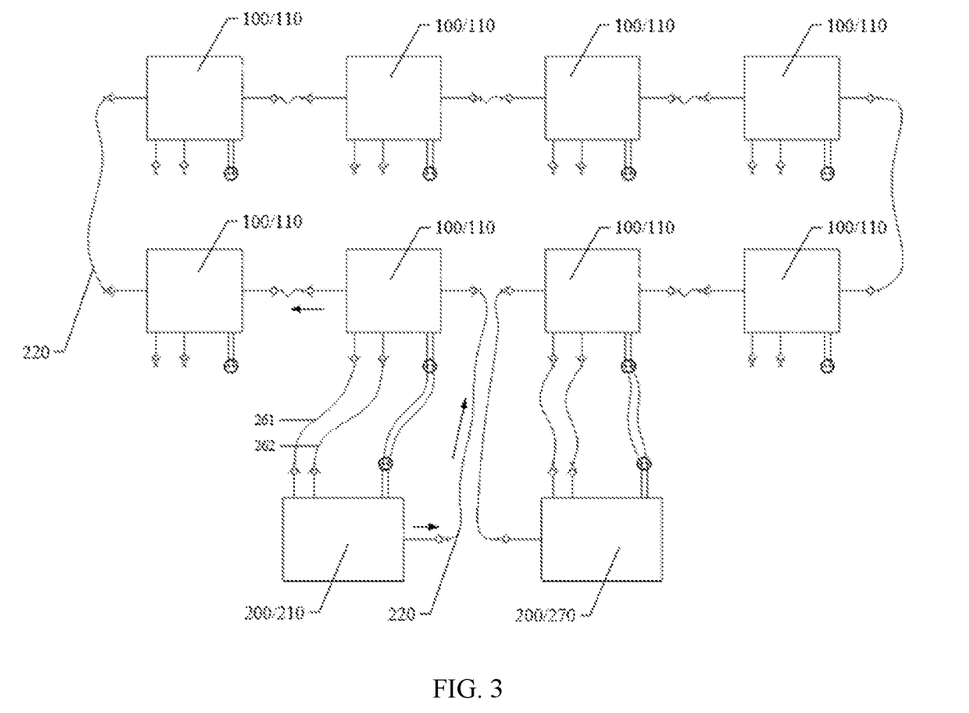
FIG. 3 is a structural diagram of a turbine fracturing truck group according to an embodiment of the present disclosure.

FIG. 3 is a structural diagram of a turbine fracturing truck group according to an embodiment of the present disclosure.

As illustrated in FIG. 3, the turbine fracturing truck group includes a plurality of turbine fracturing trucks 100, each turbine fracturing truck 100 includes a gas turbine 110, and each gas turbine 110 includes a plurality of fuel supply pipelines 111 (please refer to the following figures for the fuel supply pipelines). The turbine fracturing truck group also includes a purging system 200 which is connected to the gas turbine 110 of each turbine fracturing truck 100 and is configured to purge the fuel supply pipelines of each gas turbine 110 and the nozzles connected to the fuel supply pipelines.

It should be noted that, in the above embodiments, a turbine fracturing truck group is taken as an example to illustrate a turbine fracturing apparatus group, but the embodiments of the present disclosure are not limited to this. Embodiments of the present disclosure can also be applied to other types of turbine fracturing apparatus groups including a trailer fracturing apparatus or a skid fracturing apparatus.

In FIG. 3, the turbine fracturing truck group is equipped with 8 turbine fracturing trucks. However, the configuration in FIG. 3 is only an example, and the embodiments of the present disclosure are not limited thereto. For example, the number of the turbine fracturing trucks can be 2 or any value more than 2.

For example, the gas turbine 110 can be a bi-fuel gas turbine, that is, the fuel as used can be switched between liquid fuel and gaseous fuel. The gas turbine 110 can also be a gas turbine using liquid fuel or a gas turbine using gaseous fuel, and embodiments of the present disclosure do not limit the fuel type of the gas turbine.

A gas turbine usually includes three main components, which are a compressor, a combustor and a turbine. The compressor is configured to inhale and compress external air, and can be an axial-flow type compressor including multi-staged axial-flow blades. The pressure of the compressed air produced by the axial-flow compressor can reach several times to dozens of times of the atmospheric pressure. The compressed air produced by the compressor can be respectively introduced into the combustor and the turbine through different drainage channels inside the gas turbine. For the compressed air introduced into the combustor, a part thereof can be used as combustion air of the combustor, another part thereof can be used for cooling the cylinder wall of the combustor, and yet another part thereof can be used for purging the fuel supply pipeline and the fuel nozzles of the combustor. The compressed air introduced into the turbine can be used for cooling high-temperature turbine blades.

The combustor is configured to burn the fuel and discharge the high-temperature and high-pressure gas generated after combustion to the turbine so as to drive the turbine to rotate. One part of the power output from the rotation of the turbine is used for doing work (such as driving a plunger pump of the fracturing truck to run or driving the generator to generate electricity, etc.), and the other part is used for driving the compressor to continuously rotate so as to inhale air.

It should be noted that the fuel supply pipeline 111 and the nozzle according to the embodiments of the present disclosure can be used as a part of the combustor for supplying fuel or purge air to the combustor. A first air compressor 210 related to the present embodiment and a second air compressor described later in the embodiment of the present disclosure are compressors independent of the gas turbine, and different from the compressor of the gas turbine itself.

It should be noted that the connection structure between the purging pipeline 220 and the gas turbine 110 in FIG. 3 is only a simplified representation, which does not mean that the purging pipeline 220 and the gas turbine 110 are connected in series. The connection mode between the purging pipeline 220 and the fuel supply pipeline 111 of the gas turbine 110 will be further described later with reference to the drawings.

Figure 4:
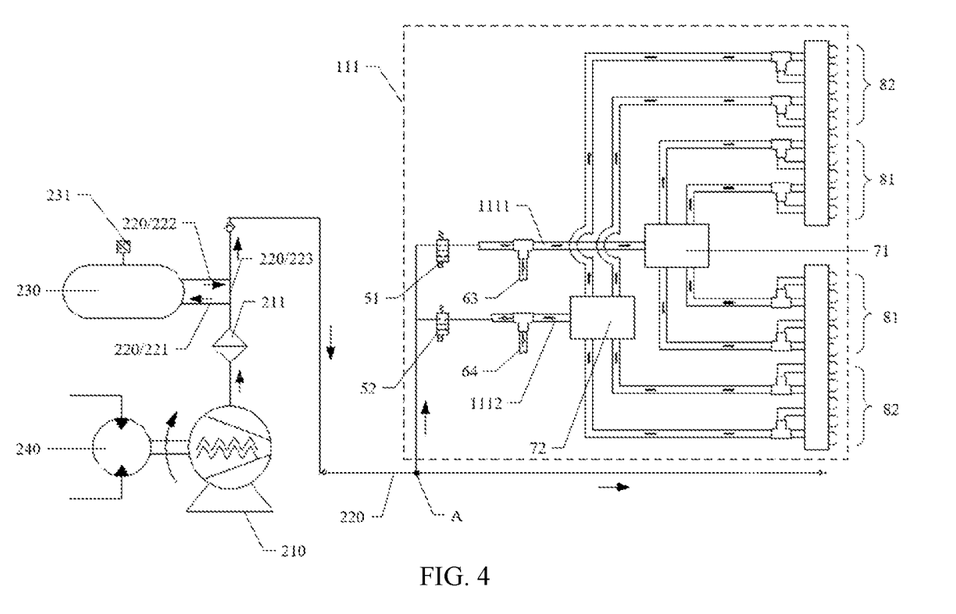
FIG. 4 is a structural diagram of a purging system for a turbine fracturing truck group according to an embodiment of the present disclosure.

FIG. 4 is a structural diagram of the purging system 200 in FIG. 3. As illustrated in FIG. 4, the purging system 200 includes a first air compressor 210 and a purging pipeline 220. The purging pipeline 220 communicates the first air compressor 210 with the plurality of fuel supply pipelines 111 of each gas turbine 110 in the turbine fracturing truck group. The first air compressor 210 is configured to, in a case where at least part of the plurality of fuel supply pipelines 111 is stopped from supplying fuel, supply compressed air to the at least part of the plurality of fuel supply pipelines 111 which has been stopped from supplying fuel, so as to perform purging.

In the purging system for the turbine fracturing truck group provided by the embodiments of the present disclosure, a single air compressor is adopted to provide purge air for a plurality of turbine fracturing trucks, so that the manufacturing cost of the purging system can be saved, the maintenance of the air compressor system is more centralized and convenient, and the workload of field operators is reduced. In the case where each turbine fracturing truck is equipped with one air compressor, if the air compressor fails, it will directly affect the normal operation of the turbine fracturing truck, so the stability of the system is poor. The purging system provided by the embodiment of the present disclosure can also be provided with a standby air compressor, and the first air compressor and the standby air compressor can be arranged outside the turbine fracturing truck. When the first air compressor fails, it can be switched to the standby air compressor at any time. Therefore, when the purging system works normally, the first air compressor can be repaired at the same time, thus improving the reliability of the purging system.

In some examples, the first air compressor 210 is a screw air compressor. The pressure of compressed air generated by the first air compressor 210 can reach 200 psi.

The screw air compressor has the advantages of high exhaust pressure and great flow rate. Therefore, the purging system does not need to be configured with additional components such as booster regulator, and the pressure and flow rate of air as generated can meet the purging requirements of the gas turbine.

As illustrated in FIG. 4, the compressed air in the purging pipeline 220 is divided into two branches at point A in the figure, one branch enters the fuel supply pipelines 111 of one gas turbine, and the other branch is configured to be connected to the fuel supply pipelines 111 of other gas turbines. The flow rate of the compressed air produced by the first air compressor 210 can meet the purging requirements of all the gas turbines in the whole turbine fracturing truck group.

In some examples, the gas turbine 110 can be a bi-fuel gas turbine, and as illustrated in FIG. 4, the plurality of fuel supply pipelines 111 include a first fuel supply pipeline 1111 and a second fuel supply pipeline 1112. The first fuel supply pipeline 1111 and the second fuel supply pipeline 1112 can also include a plurality of sub-pipelines, respectively.

In some examples, the first fuel supply pipeline 1111 can be configured to supply liquid fuel, and the second fuel supply pipeline 1112 can be configured to supply gaseous fuel.

As illustrated in FIG. 4, the liquid fuel supply inlet 63 supplies liquid fuel to the first fuel supply pipeline 1111, the first fuel supply pipeline 1111 is provided with a liquid fuel flow divider 71 which divides the first fuel supply pipeline 1111 into a plurality of branches, and an end of each branch is connected to at least one liquid fuel nozzle 81. The gaseous fuel supply inlet 64 supplies fuel to the second fuel supply pipeline 1112. The second fuel supply pipeline 1112 is provided with a gaseous fuel flow divider 72, the gaseous fuel flow divider 72 divides the second fuel supply pipeline 1112 into a plurality of branches, and an end of each branch is connected to at least one gaseous fuel nozzle 82.

The first fuel supply pipeline 1111 is provided with a first switch 51, and the second fuel supply pipeline 1112 is provided with a second switch 52. The first switch 51 and the second switch 52 both can be a solenoid valve.

During the operation of the gas turbine, when it burns liquid fuel (e.g., diesel oil), the liquid fuel supply inlet 63 supplies liquid fuel to the first fuel supply pipeline 1111, the gaseous fuel supply inlet 64 stops supplying fuel to the second fuel supply pipeline 1112, the first switch 51 is closed and the second switch 52 is opened, and the first air compressor 210 supplies compressed air to the second fuel supply pipeline 1112, so as to purge the second fuel supply pipeline 1112 and the gaseous fuel nozzle 82 connected to an end thereof. When it burns gaseous fuel (e.g., natural gas), the gaseous fuel supply inlet 64 supplies gaseous fuel to the second fuel supply pipeline 1112, the liquid fuel supply inlet 63 stops supplying fuel to the first fuel supply pipeline 1111, the second switch 52 is closed and the first switch 51 is opened, and the second air compressor 210 supplies compressed air to the first fuel supply pipeline 1111, so as to purge the first fuel supply pipeline 1111 and the liquid fuel nozzle 81 connected to an end thereof.

It should be noted that the gas turbine 110 can also be a gas turbine using a single type of fuel, and accordingly, the first fuel supply pipeline 1111 and the second fuel supply pipeline 1112 both are used for supplying liquid fuel or both are used for supplying gaseous fuel. When some sub-pipelines of the first fuel supply pipeline 1111 and the second fuel supply pipeline 1112 stop supplying fuel, they also need to be purged by the above-mentioned purging system, and the purging process is similar to the above-mentioned process without repeating here.

In some examples, as illustrated in FIG. 3, the first air compressor 210 of the purging system 200 is arranged outside the turbine fracturing truck 100. By arranging the air compressor outside the turbine fracturing truck, the weight of the turbine fracturing truck is reduced, and a sufficient space is reserved for installation and maintenance of other components on the turbine fracturing truck.

In some examples, as illustrated in FIG. 4, the purging system 200 further includes an air storage device 230, the air storage device 230 is connected to the purging pipeline 220 and can be, for example, an air cylinder. The purging pipeline 220 includes a first purging pipeline 221 and a second purging pipeline 222. An air inlet of the air storage device 230 is communicated with the first air compressor 210 through the first purging pipeline 221, and an air outlet of the air storage device 230 is communicated with the plurality of fuel supply pipelines 111 of each gas turbine 110 in the turbine fracturing truck group through the second purging pipeline 222.

For example, when the purging system works, compressed air generated by the first air compressor 210 enters the air storage device 230 through the first purging pipeline 221, and the compressed air in the air storage device 230 enters the fuel supply pipeline 111 of the gas turbine 110 through the second purging pipeline 222 so as to perform purging. The air storage device can function for buffering, so that the air flow entering the fuel supply pipeline of the gas turbine is more stable, which is beneficial to the operation of the gas turbine.

In some examples, as illustrated in FIG. 4, the purging pipeline 220 can further include a third purging pipeline 223, the third purging pipeline 223 directly communicates the first air compressor 210 with the plurality of fuel supply pipelines 111 of each gas turbine 110 in the turbine fracturing truck group.

For example, when the purging system is working, the compressed air generated by the first air compressor 210 can also directly enter the fuel supply pipeline 111 of the gas turbine 110 through the third purging pipeline 223 instead of the air storage device 230 so as to perform purging. In some cases, the high-temperature and high-pressure air discharged from the air compressor will produce a large amount of condensed water in the air cylinders after being cooled by pipelines and air cylinders. During the operation, each air cylinder needs to be drained frequently, which brings a large workload to the field operators. Therefore, when the purging system directly purges the fuel supply pipeline without utilizing the air storage device, the workload of field operation can be reduced.

The above-described two modes of air supply both can achieve the purpose of purging the gas turbine, and have their advantages respectively. The mode of air supply can be flexibly selected according to actual needs of the purging operation by adding valves on the first purging pipeline, the second purging pipeline and the third purging pipeline, respectively.

In some examples, as illustrated in FIG. 4, the purging system 200 further includes a pressure sensor 231, the pressure sensor 231 is connected to the air storage device 230. The pressure sensor 231 is configured to detect a pressure inside the air storage device 230 and generate a pressure signal. In this way, the pressure can be monitored in real time, which is convenient to realize an automatic pressure control and is beneficial to improve the safety of the purging system.

In some examples, as illustrated in FIG. 4, the purging system 200 further includes a filter 211 installed at one end of the purging pipeline 220 close to the first air compressor 210, and the filter 211 is configured to purify the air coming out of the first air compressor. For example, the filter 211 can be an oil removal filter, which is beneficial to remove oil impurities contained in the air and improve the safety of purging operation.

Figure 5:
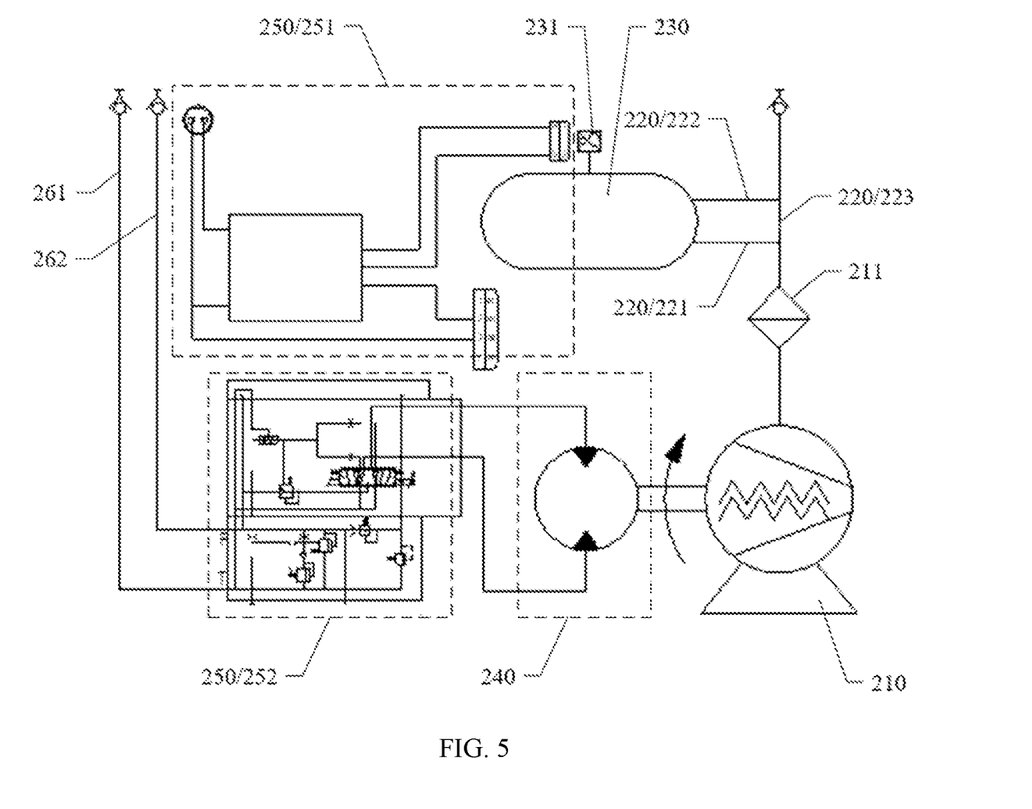
FIG. 5 is a structural diagram of a power device and a control device of a purging system according to an embodiment of the present disclosure.

The purging system 200 can further include a power device 240 and a control device 250. FIG. 5 is a structural diagram of the power device and control device of the purging system. As illustrated in FIG. 5, the power device 240 is connected to the first air compressor 210 and configured to drive the first air compressor 210 to operate; the control device 250 is connected to the power device 240 and is configured to control the power device 240.

For example, as illustrated in FIG. 5, the power device 240 can be a hydraulic motor. The control device 250 includes a processor 251 and a solenoid valve 252, and the processor 251 is respectively communicatively connected to the pressure sensor 231 and the solenoid valve 252. The processor 251 is configured to control an opened extent of the solenoid valve 252 according to the pressure signal of the pressure sensor 231, so as to adjust a rotating speed of the hydraulic motor 240, thereby adjusting the pressure and flow rate of the compressed air generated by the first air compressor 210.

In the working process, the pressure sensor 231 on the air cylinder 230 monitors the air pressure in the air cylinder, and feeds back the pressure signal to the processor 251. After that, the processor 251 controls a rotating speed of the hydraulic motor 240 through the solenoid valve 252, thereby adjusting the displacement and pressure of the first air compressor 210, so that the pressure in the air cylinder 230 is always kept in a suitable range, for example, the pressure is about 200 psi. This pressure value is only an example, and the embodiment of the present disclosure does not limit the discharge pressure of the first air compressor and the air pressure in the air storage device.

For example, the solenoid valve 252 can be a proportional control valve, which can continuously and proportionally control the pressure and flow rate of the hydraulic system, and is convenient for remote control and reliable operation.

For example, as illustrated in FIG. 5, when the power device 240 is a hydraulic motor, the purging system 200 is further provided with an oil inlet pipeline 261 and an oil return pipeline 262, which are respectively connected to an oil inlet and an oil outlet of the hydraulic motor. For example, each turbine fracturing truck in the turbine fracturing truck group is reserved with a hydraulically driven oil inlet interface and an oil return interface for the hydraulic motor, so as to be connected to the oil inlet pipeline 261 and the oil return pipeline 262 respectively. An electrical power supply interface is reserved for each turbine fracturing truck in the turbine fracturing truck group to provide a power supply for power consumption units of the purging system. For example, the electrical power supply interface can supply power for the switch of the first air compressor 210 and the control device 250. The purging system 200 can be quickly connected to the nearest turbine fracturing truck through hydraulic pipelines and cables according to the condition of field layout.

In some examples, the first air compressor 210 can also be electrically driven. At this time, the power device can be an electric motor, and the control device includes a processor which is communicatively connected to the pressure sensor. The processor is configured to control a rotating speed of the electric motor according to a pressure signal of the pressure sensor, so as to adjust the pressure and flow rate of the compressed air generated by the first air compressor.

In some examples, as illustrated in FIG. 3, the purging system 200 further includes a second air compressor 270 arranged in parallel with the first air compressor 210. The connection mode between the second air compressor 270 and the fuel supply pipeline of the gas turbine is as same as that of the first air compressor 210, which will not be described in detail here. The second air compressor 270 is configured to supply compressed air, alone, or together with the first air compressor 210, to the at least part of the fuel supply pipelines 111 which has been stopped from supplying fuel, so as to perform purging.

During the working process of the purging system, the pressure sensor monitors the air pressure in the air cylinder in real time. When the first air compressor fails or when the maximum displacement still cannot ensure that the air pressure in the air cylinder meets the purging requirements, the purging system can automatically start the second air compressor, so that the second air compressor can participate in the working process to improve the safety of system operation.

For example, the first air compressor automatically adjusts the air pressure in the air cylinder by a method as follows.

The processor 251 reads a pressure in the air cylinder 230 measured by the pressure sensor, and determines whether the pressure is greater than or equal to 200 psi. If the determined result is positive, no operation is performed.

If the determined result is negative, outputting prompt information.

According to the prompt information, the processor 251 adjusts the rotating speed of the hydraulic motor 240 through the solenoid valve 252, thereby increasing the displacement of the first air compressor until the prompt information disappears.

For example, a method of starting the second air compressor is as follows.

When the prompt information above is maintained for more than a predetermined time (for example, 1 minute), starting the second air compressor until the prompt information disappears.

In some examples, as illustrated in FIG. 4, the plurality of fuel supply pipelines 111 of at least one gas turbine in the turbine fracturing truck group include a liquid fuel supply pipeline 1111 and a gaseous fuel supply pipeline 1112. The liquid fuel supply pipeline 1111 is provided with a first switch 51, and the gaseous fuel supply pipeline 1112 is provided with a second switch 52. The first switch 51 and the second switch 52 both can be a solenoid valve. The working mode of the gas turbine burning liquid fuel can be referred to as oil mode, and the working mode of the gas turbine burning gaseous fuel can be referred to as gas mode. The oil mode and gas mode are not performed at the same time.

An embodiment of the present disclosure further provides a purging method of the purging system provided by any of the embodiments above. The purging method includes the following steps:

Starting the first air compressor at the same time when starting any one of the gas turbines in the turbine fracturing truck group. The gas turbine can choose to operate in the oil mode or the gas mode.

When the gas turbine is in the oil mode, that is, in a state where the liquid fuel supply pipeline 1111 supplies liquid fuel and the gaseous fuel supply pipeline 1112 stops supplying fuel, turning on the second switch 52 to supply compressed air to the gaseous fuel supply pipeline 1112.

When the gas turbine is in the gas mode, that is, in a state where the gaseous fuel supply pipeline 1112 supplies gaseous fuel and the liquid fuel supply pipeline 1111 stops supplying fuel, turning on the first switch 51 to supply compressed air to the liquid fuel supply pipeline 1111.

During the operation of the gas turbine, of the two groups of fuel nozzles in the combustor, one group is configured to supply combustion medium for doing work and the other group is configured to supply compressed air for purging. When the temperature is relatively high, the fuel remaining at the nozzle is easy to generate carbon deposition and block the nozzle. According to the purging method provided by the embodiment of the present disclosure, the compressed air can be used for purging the fuel pipelines and nozzles which do not supply fuel, so as to avoid carbon deposition resulted by the nozzles being purged, and improve the safety of the fuel pipelines.

In some examples, when the fracturing operation is completed or the gas turbine needs to be stopped under other circumstances, the control system sends a shutdown instruction to the gas turbine that needs to be stopped. In this case, the purging method includes: after receiving an instruction to stop at least one gas turbine, perform the following operations:

When the gas turbine is in the oil mode, that is, when the liquid fuel supply pipeline 1111 supplies liquid fuel and the gaseous fuel supply pipeline 1112 stops supplying fuel, lowing a flow rate of fuel at the liquid fuel supply pipeline 1111, so that the gas turbine runs at low power and an exhaust temperature of the gas turbine gradually decreases. When the exhaust temperature of the gas turbine is lower than a predetermined temperature, closing the liquid fuel supply pipeline 1111 and turning off the second switch 52.

When the gas turbine is in the gas mode, that is, when the gaseous fuel supply pipeline 1112 supplies gaseous fuel and the liquid fuel supply pipeline 1111 stops supplying fuel, lowing a flow rate of fuel at the gaseous fuel supply pipeline 1112, so that the gas turbine runs at low power and the exhaust temperature of the gas turbine gradually decreases. When the exhaust temperature of the gas turbine is lower than the predetermined temperature, closing the gaseous fuel supply pipeline 1112 and turning off the first switch 51.

When the temperature is lower than the predetermined temperature, the fuel remaining at the nozzle will not generate carbon deposition or the amount of carbon deposition as generated will be very small. The predetermined temperature can be configured according to actual needs, for example, 200° C., which is not limited by the embodiments of the present disclosure.

The following statements should be noted:
(1) The accompanying drawings involve only the structure(s) in connection with the embodiment(s) of the present disclosure, and other structure(s) can be referred to common design(s).
(2) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A purging system for a turbine fracturing apparatus group, wherein the turbine fracturing apparatus group comprises a plurality of turbine fracturing apparatuses, each of the plurality of turbine fracturing apparatuses comprises a gas turbine, each gas turbine comprises a plurality of fuel supply pipelines, the purging system comprising:
a first air compressor and a purging pipeline, wherein the purging pipeline is configured to communicate the first air compressor with the plurality of fuel supply pipelines of each gas turbine in the turbine fracturing apparatus group, the first air compressor is configured to, in a case where at least part of the plurality of fuel supply pipelines is stopped from supplying fuel, supply compressed air to the at least part of the plurality of fuel supply pipelines which has been stopped from supplying fuel, so as to perform purging;

an air storage device connected to the purging pipeline, wherein the purging pipeline comprises a first purging pipeline and a second purging pipeline, an air inlet of the air storage device is communicated with the first air compressor through the first purging pipeline, and an air outlet of the air storage device is communicated with the plurality of fuel supply pipelines of each gas turbine in the turbine fracturing apparatus group through the second purging pipeline;

a pressure sensor configured to detect a pressure inside the air storage device and generate a pressure signal;

a power device connected to the first air compressor and configured to drive the air compressor; and a control device connected to the power device and configured to control the power device, wherein:
the power device comprises a hydraulic motor, and the control device comprises a processor and a solenoid valve, the processor is respectively communicatively connected to the pressure sensor and the solenoid valve, and is configured to control the solenoid valve according to the pressure signal of the pressure sensor so as to adjust a rotating speed of the hydraulic motor, thereby adjusting a pressure and a flow rate of the compressed air generated by the first air compressor, or;

the power device comprises an electric motor, and the control device comprises a processor, wherein the processor is communicatively connected to the pressure sensor and configured to control a rotating speed of the electric motor according to the pressure signal of the pressure sensor, thereby adjusting a pressure and a flow rate of the compressed air generated by the first air compressor.

2. The purging system for the turbine fracturing apparatus group according to claim 1, wherein the first air compressor is arranged outside a plurality of turbine fracturing apparatuses of the turbine fracturing apparatus group.

3. The purging system for the turbine fracturing apparatus group according to claim 1, wherein the purging pipeline further comprises a third purging pipeline which is configured to directly communicate the first air compressor with the plurality of fuel supply pipelines of each gas turbine in the turbine fracturing apparatus group.

4. The purging system for the turbine fracturing apparatus group according to claim 1, wherein the solenoid valve is a proportional control valve.

5. The purging system for the turbine fracturing apparatus group according to claim 1, wherein the first air compressor comprises a screw air compressor.

6. The purging system for the turbine fracturing apparatus group according to claim 1, wherein a maximum pressure of the compressed air generated by the first air compressor is greater than or equal to 200 psi.

7. The purging system for the turbine fracturing apparatus group according to claim 1, wherein:
the plurality of fuel supply pipelines comprise a first fuel supply pipeline and a second fuel supply pipeline;
when the first fuel supply pipeline supplies fuel, the second fuel supply pipeline stops supplying fuel, and the first air compressor supplies compressed air to the second fuel supply pipeline; and when the second fuel supply pipeline supplies fuel, the first fuel supply pipeline stops supplying fuel, and the first air compressor supplies compressed air to the first fuel supply pipeline.

8. The purging system for the turbine fracturing apparatus group according to claim 7, wherein the first fuel supply pipeline is configured to supply liquid fuel, and the second fuel supply pipeline is configured to supply gaseous fuel.

9. A purging method performed by the purging system of claim 1, wherein the plurality of fuel supply pipelines of at least one gas turbine in the turbine fracturing apparatus group comprise a liquid fuel supply pipeline and a gaseous fuel supply pipeline, wherein the liquid fuel supply pipeline is provided with a first switch and the gaseous fuel supply pipeline is provided with a second switch, and wherein the purging method comprises:

turning on the second switch to supply compressed air to the gaseous fuel supply pipeline under a condition that the liquid fuel supply pipeline supplies liquid fuel and the gaseous fuel supply pipeline stops supplying fuel; and turning on the first switch to supply compressed air to the liquid fuel supply pipeline under a condition that the gaseous fuel supply pipeline supplies gaseous fuel and the liquid fuel supply pipeline stops supplying fuel.

10. The purging method according to claim 9, comprising, after receiving an instruction to stop the at least one gas turbine:

lowering a flow rate of fuel of the liquid fuel supply pipeline under the condition that the liquid fuel supply pipeline supplies liquid fuel and the gaseous fuel supply pipeline stops supplying fuel, and closing the liquid fuel supply pipeline and turning off the second switch under a condition that an exhaust temperature of the gas turbine is lower than a predetermined temperature; and lowering a flow rate of fuel of the gaseous fuel supply pipeline under the condition that the gaseous fuel supply pipeline supplies gaseous fuel and the liquid fuel supply pipeline stops supplying fuel, and closing the gaseous fuel supply pipeline and turning off the first switch under a condition that the exhaust temperature of the gas turbine is lower than the predetermined temperature.

11. A turbine fracturing apparatus group, comprising:
the plurality of turbine fracturing apparatuses; and
the purging system according to claim 1, wherein the purging system is connected to the gas turbine of each of the plurality of turbine fracturing apparatuses.

12. The turbine fracturing apparatus group according to claim 11, wherein the first air compressor is arranged outside the plurality of turbine fracturing apparatuses of the turbine fracturing apparatus group.

13. The turbine fracturing apparatus group according to claim 11, wherein the plurality of fuel supply pipelines of at least one gas turbine in the turbine fracturing apparatus group comprise a liquid fuel supply pipeline and a gaseous fuel supply pipeline, wherein the liquid fuel supply pipeline is provided with a first switch and the gaseous fuel supply pipeline is provided with a second switch.

14. A purging system for a turbine fracturing apparatus group, wherein the turbine fracturing apparatus group comprises a plurality of turbine fracturing apparatuses, each of the plurality of turbine fracturing apparatuses comprises a gas turbine, each gas turbine comprises a plurality of fuel supply pipelines, the purging system comprising:

a first air compressor and a purging pipeline, wherein the purging pipeline is configured to communicate the first air compressor with the plurality of fuel supply pipelines of each gas turbine in the turbine fracturing apparatus group, the first air compressor is configured to, in a case where at least part of the plurality of fuel supply pipelines is stopped from supplying fuel, supply compressed air to the at least part of the plurality of fuel supply pipelines which has been stopped from supplying fuel, so as to perform purging; and a second air compressor arranged in parallel with the first air compressor, the second air compressor is configured to supply, either alone or together with the first air compressor, compressed air to the at least part of the plurality of fuel supply pipelines which has been stopped from supplying fuel, so as to perform purging.

* * * * *